(12) United States Patent
Itoh et al.

(10) Patent No.: US 12,125,274 B2
(45) Date of Patent: Oct. 22, 2024

(54) IDENTIFICATION INFORMATION ASSIGNMENT APPARATUS, IDENTIFICATION INFORMATION ASSIGNMENT METHOD, AND PROGRAM

(71) Applicant: Panasonic Intellectual Property Management Co., Ltd., Osaka (JP)

(72) Inventors: Tomoaki Itoh, Tokyo (JP); Hidehiko Shin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 432 days.

(21) Appl. No.: 17/485,841

(22) Filed: Sep. 27, 2021

(65) Prior Publication Data

US 2022/0012514 A1    Jan. 13, 2022

Related U.S. Application Data

(63) Continuation of application No. PCT/JP2019/050935, filed on Dec. 25, 2019.

(30) Foreign Application Priority Data

Mar. 28, 2019    (JP) ................ 2019-064526

(51) Int. Cl.
*G06V 10/98* (2022.01)
*G06N 20/00* (2019.01)
(Continued)

(52) U.S. Cl.
CPC .......... *G06V 10/987* (2022.01); *G06N 20/00* (2019.01); *G06V 10/25* (2022.01); *G06V 10/94* (2022.01)

(58) Field of Classification Search
None
See application file for complete search history.

(56) References Cited

U.S. PATENT DOCUMENTS 8,325,982 B1    12/2012 Moon et al.
2012/0301032 A1    11/2012 Kawanishi et al.
(Continued)

FOREIGN PATENT DOCUMENTS

CN    102857810 A    1/2013
CN    108921151 A    11/2018
(Continued)

OTHER PUBLICATIONS

E. Lughofer, On-line active learning: A new paradigm to improve practical useability of data stream modeling methods, Information Sciences, vols. 415-416, 2017, pp. 356-376, ISSN 0020-0255 (Year: 2017).*

(Continued)

*Primary Examiner* — Vu Le
*Assistant Examiner* — Charles C L Penny
(74) *Attorney, Agent, or Firm* — Wenderoth, Lind & Ponack, L.L.P.

(57) ABSTRACT

It reduces labor and time to generate training data for the training model. An identification information assignment apparatus includes an acquirer configured to acquire a plurality of pieces of image data, an assigner configured to assign identification information to image data selected from the plurality of pieces of image data by using a learning model after learning, and an updater configured to update the learned model using the image data to which the identification information is assigned, wherein the assigner assigns identification information to a rest of the image data acquired by the acquirer using the learned model that has been updated.

8 Claims, 12 Drawing Sheets

(51) Int. Cl.
*G06V 10/25* (2022.01)
*G06V 10/94* (2022.01)

(56) References Cited

U.S. PATENT DOCUMENTS

| | | | |
|---|---|---|---|
| 2012/0308202 | A1 | 12/2012 | Murata et al. |
| 2018/0039820 | A1* | 2/2018 | Begeja .................. G06V 20/52 |
| 2018/0342077 | A1 | 11/2018 | Tsuno et al. |
| 2019/0156202 | A1* | 5/2019 | Falk ....................... G06N 3/045 |
| 2020/0125894 | A1* | 4/2020 | Maeda .................. G06V 10/44 |

FOREIGN PATENT DOCUMENTS

| | | |
|---|---|---|
| CN | 109215487 A | 1/2019 |
| JP | 2018-200531 | 12/2018 |
| JP | 2018-537798 | 12/2018 |
| WO | 2017/055878 | 4/2017 |
| WO | 2017/190743 | 11/2017 |

OTHER PUBLICATIONS

A. Stumpf, N. Lachiche, J.-P. Malet, N. Kerle and A. Puissant, "Active Learning in the Spatial Domain for Remote Sensing Image Classification," in IEEE Transactions on Geoscience and Remote Sensing, vol. 52, No. 5, pp. 2492-2507, May 2014, doi: 10.1109/TGRS.2013.2262052 (Year: 2014).*

P. H. Gosselin and M. Cord, "Active Learning Methods for Interactive Image Retrieval," in IEEE Transactions on Image Processing, vol. 17, No. 7, pp. 1200-1211, Jul. 2008, doi: 10.1109/TIP.2008.924286 (hereafter referred to as Gosselin et al.) (Year: 2008).*

Zhang, J. Qin, Y. Wang and M. Liang, "Object Classification in Traffic Scene Surveillance Based on Online Semi-supervised Active Learning," 2014 22nd International Conference on Pattern Recognition, Stockholm, Sweden, 2014, pp. 3086-3091, doi: 10.1109/ICPR.2014.532 (Year: 2014).*

B. Höferlin, R. Netzel, M. Höferlin, D. Weiskopf and G. Heidemann, "Inter-active learning of ad-hoc classifiers for video visual analytics," 2012 IEEE Conference on Visual Analytics Science and Technology (VAST), Seattle, WA, USA, 2012, pp. 23-32, doi: 10.1109/VAST.2012.6400492 (Year: 2012).*

Das, R. Panda, and A. K. Roy-Chowdhury, "Continuous adaptation of multi-camera person identification models through sparse non-redundant representative selection," Computer Vision and Image Understanding, vol. 156, pp. 66-78, 2017. doi:10.1016/j.cviu.2016.10.012 (Year: 2017).*

Wang, H., Gong, S., & Xiang, T. (2016). Highly efficient regression for scalable person re-identification. Procedings of the British Machine Vision Conference 2016. doi:10.5244/c.30.134 (Year: 2016).*

S. Bianco, G. Ciocca, P. Napoletano, and R. Schettini, "An interactive tool for manual, semi-automatic and automatic video annotation," Computer Vision and Image Understanding, vol. 131, pp. 88-99, 2015. doi:10.1016/j.cviu.2014.06.015 (Year: 2015).*

E. Lughofer, "On-line active learning: A new paradigm to improve practical useability of data stream modeling methods," Information Sciences, vol. 415-416, pp. 356-376, Nov. 2017. doi:10.1016/j.ins.2017.06.038 (Year: 2017).*

Ye, Z., Liu, P., Liu, J., Tang, X., & Zhao, W. (2016). Practice makes perfect: An adaptive active learning framework for Image Classification. Neurocomputing, 196, 95-106. doi: 10.1016/j.neucom.2016.01.091 (Year: 2016).*

English translation of the International Preliminary Report on Patentability issued Oct. 7, 2021 in International Application No. PCT/JP2019/050935.

International Search Report issued Feb. 10, 2020 in International (PCT) Application No. PCT/JP2019/050935 with English translation.

Extended European Search Report issued Apr. 11, 2022 in corresponding European Patent Application No. 19921044.4.

Standard Ai: "Autonomous Checkout, Real Time System v0.1", Jun. 12, 2017, XP055905563, Retrieved from the Internet: URL:https://www.youtube.com/watch?v=9NKzMaEFCFI.

Office Action issued Aug. 8, 2023 in corresponding Japanese Patent Application No. 2021-508771, with English translation.

Office Action issued Feb. 15, 2024 in corresponding European patent application No. 19921044.4, 6 pages.

Office Action issued Aug. 29, 2024 in corresponding Chinese application No. 201980094567.0, with machine translation, 18 pages.

* cited by examiner

IDENTIFICATION INFORMATION ASSIGNMENT APPARATUS, IDENTIFICATION INFORMATION ASSIGNMENT METHOD, AND PROGRAM

CROSS-REFERENCE TO RELATED APPLICATIONS

This is a continuation application of International Application No. PCT/JP2019/050935, with an international filing date of Dec. 25, 2019, which claims priority of Japanese Patent Application No. 2019-064526 filed on Mar. 28, 2019, each of the content of which is incorporated herein by reference in its entirety.

TECHNICAL FIELD

The present disclosure relates to an identification information assignment apparatus, an identification information assignment method, and a computer program that assign identification information to data used in machine learning.

BACKGROUND ART

In recent years, machine learning has been used in various fields. In machine learning, an amount of learning data is important, and a highly accurate result can be obtained by performing learning with a large amount of learning data. At this time, information related to data is to be assigned in advance. Such work is called annotation, and for example, in a case where a person is shown in photograph data, position information of a region where the person exists in the photograph data, information such as a category of "person", or the like is assigned.

Since the amount of learning data is enormous, it takes a lot of labor and time to manually perform the annotation. JP 2018-200531 A discloses a technique of reducing manual work. JP 2018-200531 A discloses a technique of manually generating reference data first and generating learning data using the reference data.

SUMMARY

The present disclosure provides an identification information assignment apparatus, an identification information assignment method, and a non-transitory computer-readable recording medium storing a computer program capable of easily creating learning data.

An identification information assignment apparatus of the present disclosure includes an acquirer configured to acquire a plurality of pieces of image data, an assigner configured to assign identification information to image data selected from the plurality of pieces of image data by using a learning model after learning, and an updater configured to update the learning model using the image data to which the identification information is assigned, in which the assigner assigns identification information to the rest of the image data acquired by the acquirer using the learning model that has been updated.

These general and specific aspects may be implemented by a system, a method, a computer program, and a combination thereof.

When generating learning data of machine learning, the identification information assignment apparatus, the identification information assignment method, and the non-transitory computer-readable recording medium program of the present disclosure can automatically and easily assign identification information and generate learning data.

DETAILED DESCRIPTION

Knowledge Underlying Present Disclosure

Figure 1:
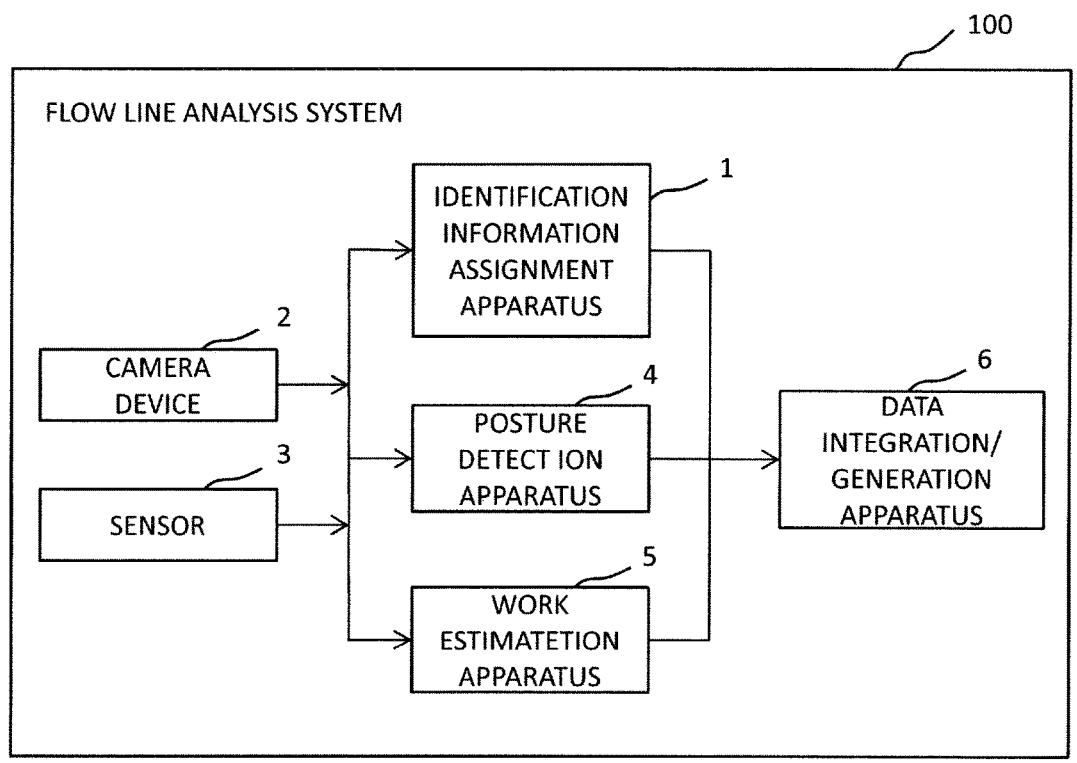
FIG. 1 is a block diagram illustrating a configuration of a flow line analysis system including an identification information assignment apparatus of the present disclosure.

In recent years, machine learning has been used in a wide variety of fields. In addition, with a progress of arithmetic units such as a high-speed graphics processing unit (GPU) server, a processing speed of image data has been also improved. As a result, by analyzing information using moving image data using machine learning or the like, it is possible to specifically analyze contents that have been difficult to analyze only by humans. For example, even in an analysis of movement of a person or an object in various places such as a factory, a warehouse, a store, and an office and analyzing the movement, use of machine learning enables highly accurate analysis that has been difficult only by human analysis using a large amount of data.

Incidentally, in a case where the machine learning is used in this manner, generation of learning data and construction of a learning model greatly depend on results. Therefore, at the time of learning data generation, an annotation that is assignment of identification information is important. However, it still takes a lot of time and effort to assign the identification information.

The present disclosure provides an identification information assignment apparatus, an identification information assignment method, and a program that automatically and easily assigns identification information to data necessary for generating learning data of machine learning. It is therefore possible to generate learning data that can obtain a highly accurate result.

Embodiment

Hereinafter, an embodiment of the present disclosure will be described with reference to the drawings. However, in the detailed description, unnecessary parts in the description of the conventional technique and the substantially same configuration may be omitted. This is to simplify the description. Further, the following description and the accompanying drawings are disclosed such that those skilled in the art can fully understand the present disclosure, and are not intended to limit the gist of the claims.

An identification information assignment apparatus, an identification information assignment method, and a computer program of the present disclosure automatically assign identification information when generating learning data of machine learning. Hereinafter, an example in which the identification information assignment apparatus extends learning data used for flow line analysis will be described. Further, in the following description, an example will be described in which a target to which the identification information is assigned in the identification information assignment apparatus is image data including a person or a cart, and the identification information on the person or the cart is assigned.

In the present disclosure, the "identification information" is information such as a tag and metadata assigned to image data serving as learning data for machine learning. Further, "assignment of identification information" is assignment of a tag or metadata to image data, and is synonymous with "annotation".

Further, in the present disclosure, a "flow line" refers to a path or a trajectory along which a person or an object moves, and the "flow line analysis" refers to recording a flow line of a person or an object and analyzing and outputting the flow line as statistical data.

<Flow Line Analysis System>

As illustrated in FIG. 1, an identification information assignment apparatus 1 of the present disclosure is used, for example, in a flow line analysis system 100 that analyzes movement of a person or the like. The flow line analysis system 100 includes an camera device 2, a sensor 3, a posture detect apparatus 4, a work estimate apparatus 5, and a data integration/generation apparatus 6 together with the identification information assignment apparatus 1.

Figure 2:
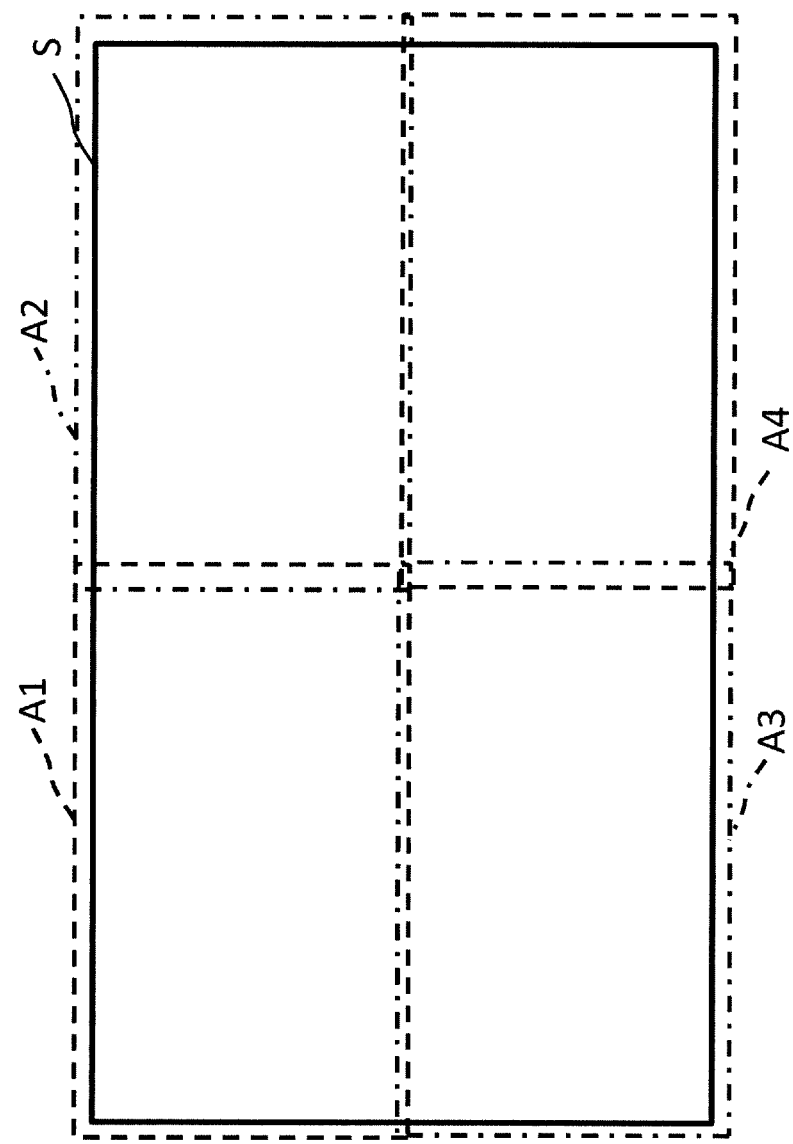
FIG. 2 is a conceptual diagram illustrating a configuration of image data used by the identification information assignment apparatus of the present disclosure.

The camera device 2 is a camera that captures a space as a target of the flow line analysis. The camera device 2 does not have to capture a moving image, but the camera device 2 is to be capable of capturing images of a plurality of continuous frames because the flow line analysis system 100 analyzes movement of a person or the like. Although only one camera device 2 is illustrated in FIG. 1, the flow line analysis system 100 may include a plurality of camera devices 2 because an entire target space is preferably captured. For example, when a space S as illustrated in FIG. 2 is captured, four camera devices 2 that capture a first region A1, a second region A2, a third region A3, and a fourth region A4 can be provided. In the flow line analysis system 100, image data simultaneously captured by the plurality of camera devices 2 can be combined into one piece of image data and used. Note that, in the following description, the image data captured at one timing will be described as one piece or already combined, and combining processing will not be described here.

The sensor 3 is, for example, a human detecting sensor that detects presence of a person, using infrared rays or ultrasonic waves. Further, the sensor 3 may be a sound sensor that detects movement of a person or the like by inputting sound. The sensor 3 may receive a radio wave transmitted from a transmitter provided on a person, a cart, an object, or the like. Although only one sensor 3 is illustrated in FIG. 1, the flow line analysis system 100 may include a plurality of sensors 3 or a plurality of types of sensors. In the flow line analysis, using a detection result by the sensor 3 can improve accuracy of detection of a person as compared with a case where a person is detected only from image data. For example, position information obtained from the sensor 3 can be utilized together with the image data, and can be used to determine whether the target of which image data is assigned with the identification information is a cart. Specifically, this is because, in a case where a transmitter is installed as the sensor 3 in the cart, where the cart is included in the image data can be accurately determined by the radio wave of the sensor 3.

The identification information assignment apparatus 1 assigns identification information to image data captured by the camera device 2. A specific configuration of the identification information assignment apparatus 1, processing in the identification information assignment apparatus 1, and the like will be described later with reference to FIGS. 3 to 9.

The posture detect apparatus 4 detects a posture of a person existing in a space as a target of the flow line analysis of the flow line analysis system 100 by using image data captured by the camera device 2 and detected data of the sensor 3. The posture detect apparatus 4 detects, for example, whether a person is standing or sitting. Specifically, when the identification information includes either state of "sitting" or "standing", the result of the posture detect apparatus 4 can be used. A specific configuration and processing of the posture detect apparatus 4 will not be described here.

The work estimate apparatus 5 uses the image data captured by the camera device 2 and the detected data of the sensor 3 to estimate the work being performed by the person present in the space as a target of the flow line analysis of the flow line analysis system 100. The work estimate apparatus 5 estimates, for example, whether a person is stopped, walking, running, or carrying an object. Specifically, when the identification information includes a work type, the result of the work estimate apparatus 5 can be used. A specific configuration and processing of the work estimate apparatus 5 will not be described here.

The data integration/generation apparatus 6 generates flow line analysis data of a person or the like in a target space by using image data generated with identification information assigned by the identification information assignment apparatus 1, detected posture data in the posture detect apparatus 4, and estimated data of work in the work estimate apparatus 5. Using the generated flow line analysis data makes it possible to effectively arrange objects and improve work contents in the target space.

<Identification Information Assignment Apparatus>

Figure 3:
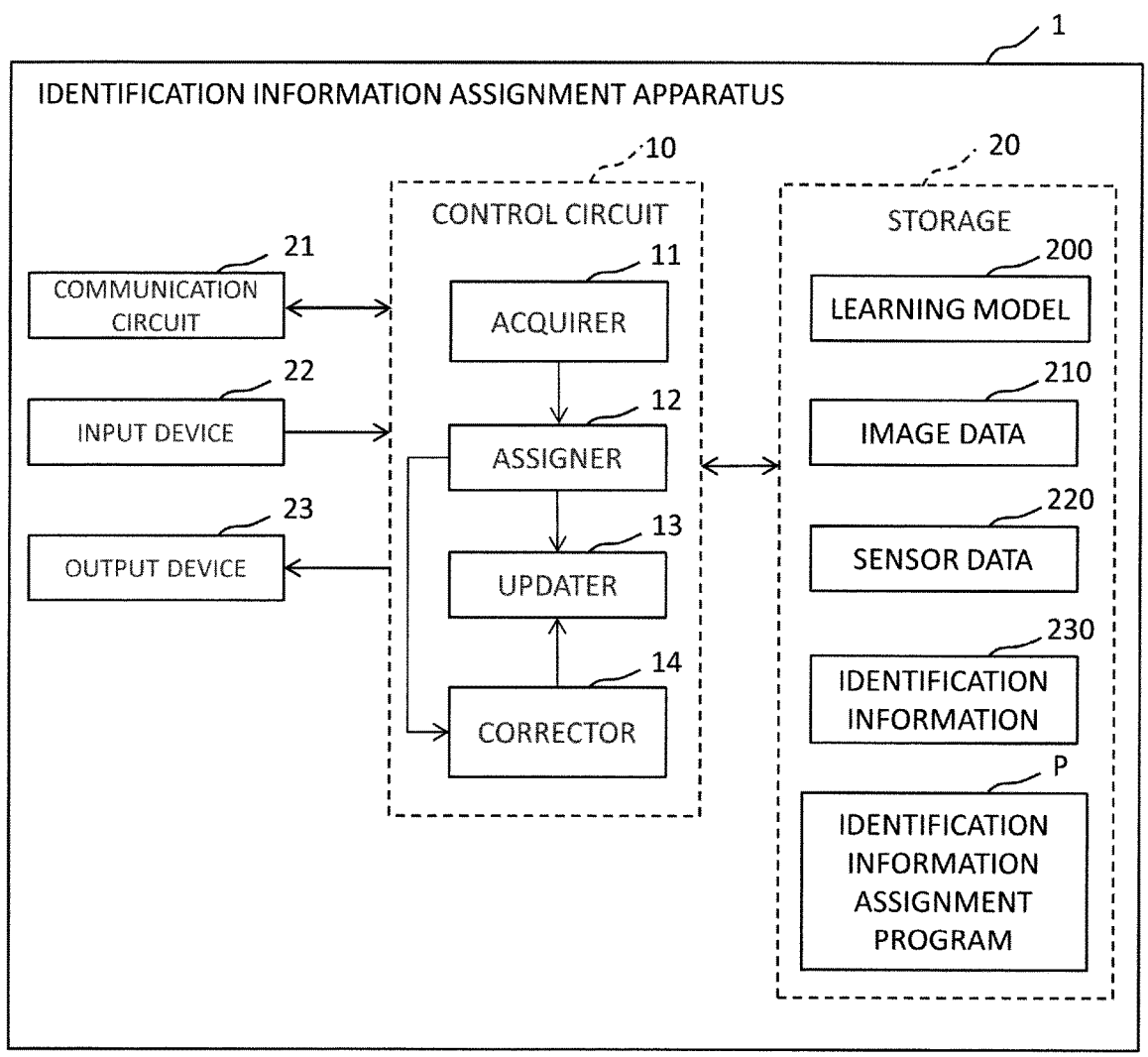
FIG. 3 is a block diagram illustrating a configuration of the identification information assignment apparatus of the present disclosure.

As illustrated in FIG. 3, the identification information assignment apparatus 1 is an information processor including a control circuit 10, a storage 20, a communication circuit 21, an input device 22, an output device 23, and the like.

The control circuit 10 is a controller that controls the entire identification information assignment apparatus 1. For example, the control circuit 10 reads and executes an identification information assignment program P stored in the storage 20, and thus executes processing as an acquirer 11, an assigner 12, a corrector 14, and an updater 13. Further, the control circuit 10 is not limited to a control circuit that implements a predetermined function in coordination with hardware and software, and may be a hardware circuit designed exclusively for implementing a predetermined function. That is, the control circuit 10 can be achieved by various processors such as a central processing unit (CPU), a micro processing unit (MPU), a graphics processing unit (GPU), a field-programmable gate array (FPGA), a digital signal processor (DSP), and an application specific integrated circuit (ASIC).

The storage 20 is a recording medium that records various types of information. The storage 20 is achieved by, for example, a random access memory (RAM), a read only memory (ROM), a flash memory, a solid state drive (SSD), a hard disk, other storage devices, or an appropriate combination thereof. In addition to the identification information assignment program P executed by the control circuit 10, the storage 20 stores information to be used for the identification information, various information acquired for assigning the identification information, and the like. For example, the storage 20 stores a learning model 200, image data 210, sensor data 220, and identification information 230.

The communication circuit 21 is an interface circuit (module) for enabling data communication with an external device (not illustrated). The input device 22 is an input device such as an operation button, a keyboard, a mouse, a touch screen, and a microphone used for operation and data input. The output device 23 is an output device such as a display or a speaker used for outputting a processing result or data.

Note that the identification information assignment apparatus 1 may be achieved by a plurality of information processors. Further, a part of data stored in the storage 20 may be stored in an external storage, and may be read from the external storage and used. For example, it is sufficient that the identification information assignment apparatus 1 is able to use the learning model 200, and the identification information assignment apparatus 1 may be configured to read out the learning model 200 from an external server or the like for use.

Figure 4:
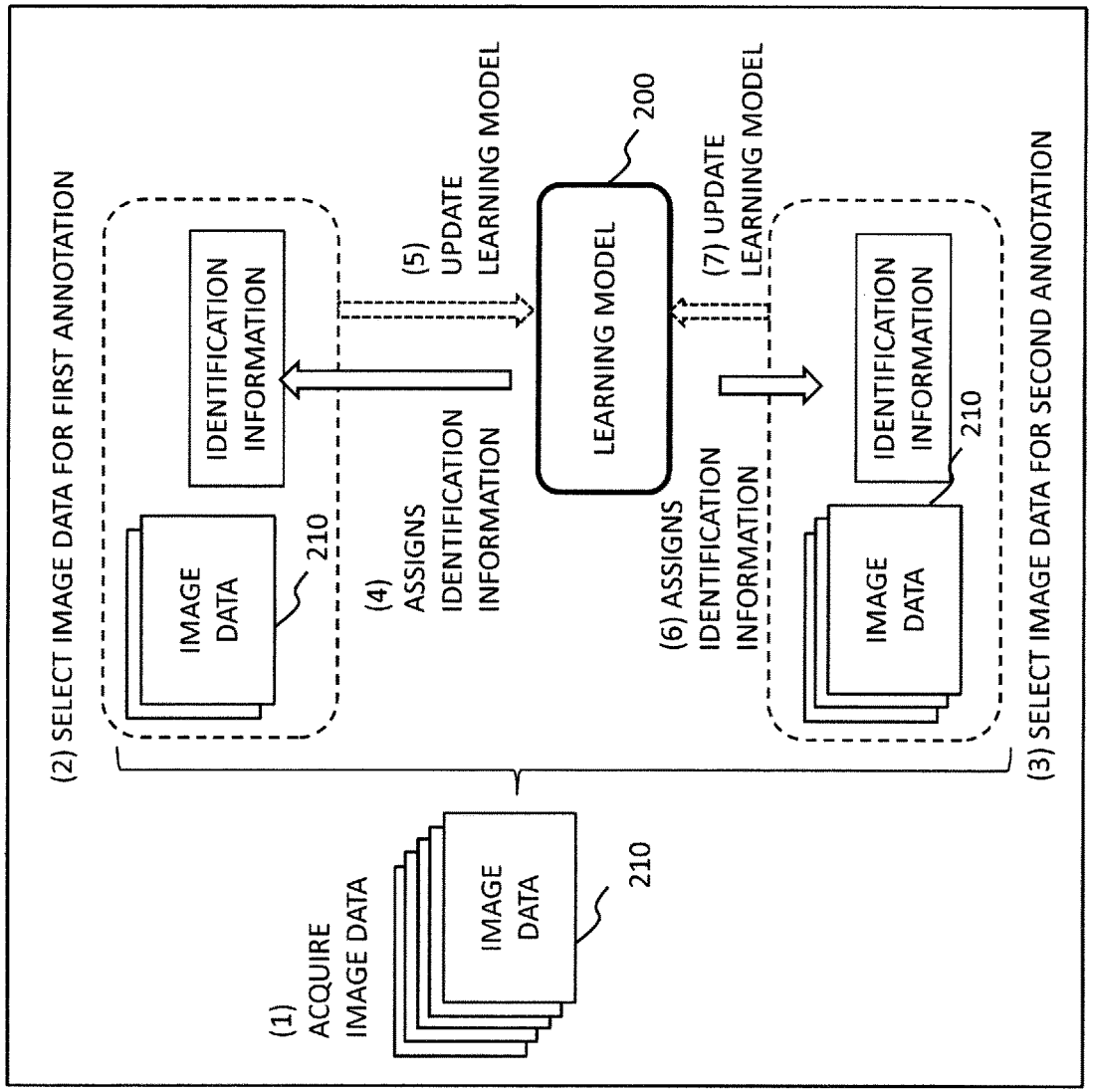
FIG. 4 is a conceptual diagram illustrating assignment of identification information in the identification information assignment apparatus in FIG. 3.

The acquirer 11 acquires a plurality of pieces of image data 210 captured by the camera device 2 ((1) in FIG. 4). Further, the acquirer 11 acquires the sensor data 220 detected by the sensor 3. Further, the acquirer 11 stores the acquired image data 210 and sensor data 220 in the storage 20. At this time, for example, the image data 210 and the sensor data 220 are associated with each other by including capturing time of the image data 210 and detection time of the sensor data 220.

Figure 5:
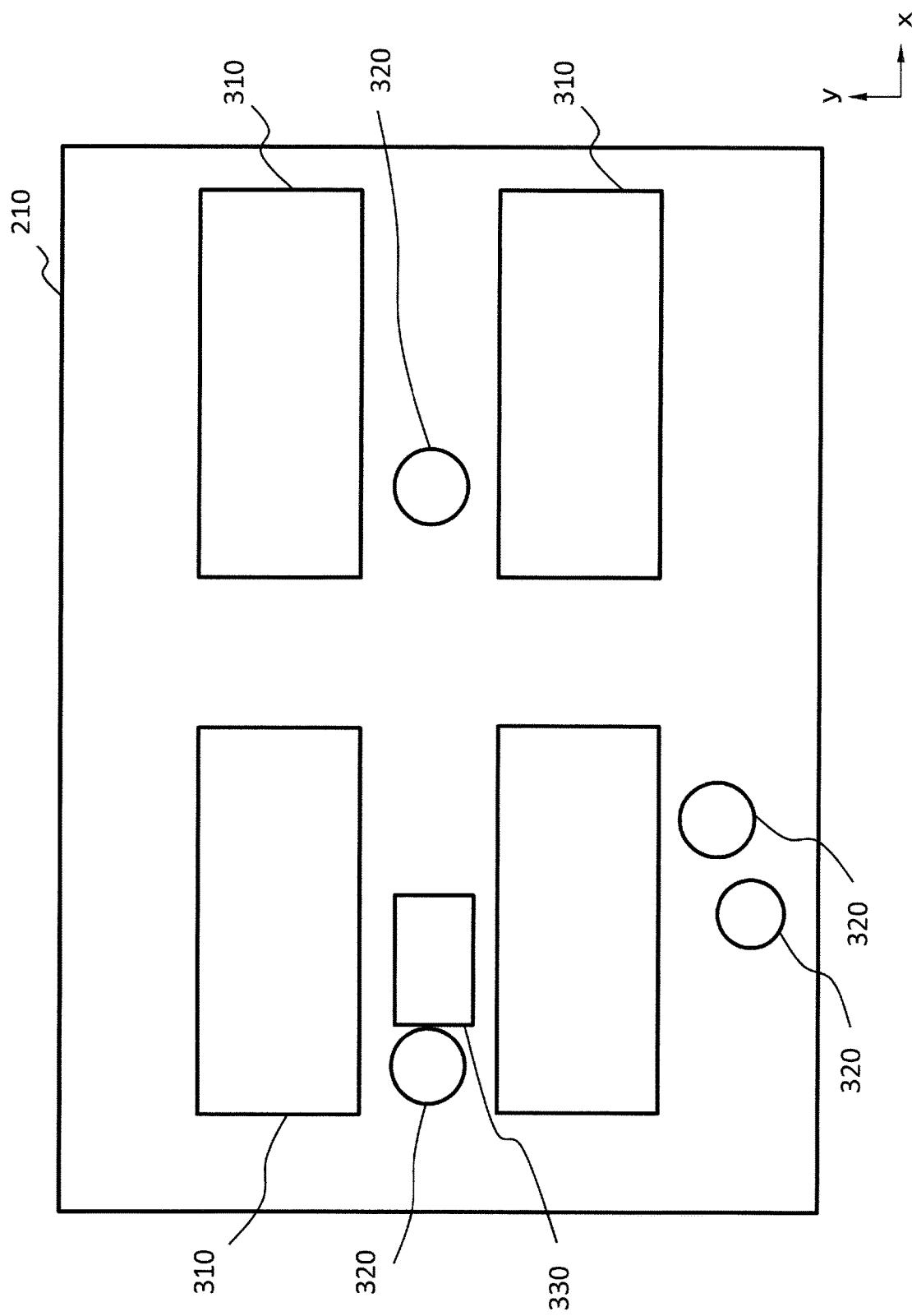
FIG. 5 is an example of image data to which identification information is assigned in the identification information assignment apparatus in FIG. 3.

The plurality of pieces of image data 210 acquired by the acquirer 11 is, for example, continuous data such as moving image data and still image data of a plurality of frames continuously captured. That is, the image data 210 includes data of the plurality of frames continuously captured. For example, as illustrated in FIG. 5, the acquirer 11 acquires the image data 210 in which a person 320 such as a clerk or a customer and a cart 330 are present in a store where a plurality of product shelves 310 is disposed. Further, at this time, for example, data detected by the sensor 3 installed on the cart 330 may be associated with the image data 210 as the sensor data 220, or data detected by the sensor 3 installed on the product shelves 310 may be associated with the image data.

The assigner 12 assigns the identification information to a part of the image data selected from the plurality of pieces of image data 210 using the learning model 200 generated in advance. Examples of the identification information include information in which "coordinates" from which a target is extracted in the image data 210, a "width" that is a length in an x-axis direction and a "height" that is a length in a y-axis direction of a region extracted as the target, a "class" for specifying a type of the target, and the like are associated. Note that the image data 210 may include a plurality of targets, and thus a plurality of regions may be extracted from one piece of image data 210, and a plurality of pieces of identification information may be assigned. Further, the assigner 12 stores the identification information in the storage 20 in association with the image data 210.

Examples of methods of selecting, by the assigner 12, the image data 210 to which the identification information is to be assigned from the plurality of pieces of image data 210 include a "method 1: method of selecting at regular intervals", a "method 2: method of randomly selecting", a "method 3: method of calculating a feature amount of each piece of image data 210 using image processing and selecting image data 210 having a large difference in features". For example, in the method 1, an operation of the processing is simple, and processing time can be reduced as compared with other methods. In the method 3, images having different appearances are selected, and thus variations of the learning data increase, and it is therefore possible to cope with many variations of images.

Specifically, in the method 1, the assigner 12 selects a part of the image data 210 as "for first annotation" ((2) in FIG. 4) from the image data 210 stored in the storage 20, and sets the rest of the image data 210 as "for second annotation" ((3) in FIG. 4). If there are 100,000 frames of image data 210, for example, by selecting one frame of image data for every 200 frames, a total of 500 frames of image data can be selected.

Further, the assigner 12 executes "first annotation processing" using the learning model 200 created in advance, and assigns identification information to each piece of the selected image data 210 ((4) in FIG. 4). Thereafter, when the learning model 200 is updated by the updater 13 using the image data 210 to which the identification information has been assigned by the first annotation processing ((5) in FIG. 4), the assigner 12 assigns the identification information to the image data 210 for the second annotation to which the identification information has not been assigned by the first annotation processing by the updated learning model 200 as "second annotation processing" ((6) in FIG. 4). Note that, subsequently, the learning model 200 is updated by the image data 210 for the second annotation to which the identification information is assigned by the updater 13 ((7) in FIG. 4).

Here, the learning model 200 used by the assigner 12 is preferably a model generated by image data that is relevant or similar to the image data 210. That is, the storage 20 stores a plurality of learning models 200 associated with feature information of the image, and the assigner 12 selects and uses the learning model 200 associated with the feature information of the target image data 210 to which the identification information is assigned and the feature information of a predetermined range. As a result, it is possible to assign identification information to the image data 210 by using the existing learning model 200.

For example, the feature information associated with the image data 210 is an image capturing condition of the image data 210. The "image capturing condition" is information such as an "image capturing location", a "purpose of the image capturing location", a "category of the image capturing location", an "attachment position of the camera device 2", and a "feature of a person included in the image data 210". Here, the "image capturing condition" of the image data 210 is inputted by an operator via the input device 22, for example, when the acquirer 11 starts acquisition of the image data 210. In this way, the assigner 12 uses the learning model 200 associated with the image capturing condition identical to the image capturing condition of the image data. Note that the term "identical" is not as strict as completely identical, and may include, for example, those in which generic concepts are identical or similar. Further, the learning model 200 in which a combination of a plurality of associated image capturing conditions is identical or similar may be used.

Specifically, an example in which the "image capturing locations" are identical refers to an example of using the learning model 200 generated by using image data captured at the identical location to that of the image data 210. In a case where the learning model 200 is used for the flow line analysis, for example, in a case where the image capturing locations are identical, accuracy of the flow line analysis can be improved by using the learning model 200 generated using image data captured at the identical location.

Further, an example in which the "purposes of the image capturing location" are identical refers to an example of using the learning model 200 generated by using image data captured at the identical purpose of location to that of the image data 210. In a case where the image data 210 is captured in a factory, for example, the learning model 200 generated from the image data captured in a factory manufacturing the identical product is used. In a case where the learning model is used for the flow line analysis, for example, in a case where the purposes of the image capturing locations are identical, a person often moves along a similar flow line at a location of the identical purpose. Thus, the accuracy of the flow line analysis can be improved by using the learning model 200 generated using the image data captured at the location of the identical purpose.

Further, an example in which "the category of the image capturing location" is identical refers to an example of using the learning model 200 generated by using image data captured in a store of an identical group to that of the image data 210 or a store of an identical product to that of the image data 210. In a case where the image data 210 is captured at a convenience store, for example, the learning model 200 generated from the image data captured at another convenience store is used. In a case where the learning model is used for the flow line analysis, for example, in a case where categories of the image capturing locations are identical, people often move along similar flow lines at a location of the identical category. Thus, the accuracy of the flow line analysis can be improved by using the learning model 200 generated using image data captured at the location of the identical category.

Further, the example in which "the attachment position of the camera device 2" is identical refers to an example of using a learning model generated by using image data installed at an identical height. For example, another identical condition can be combined with the attachment position of an image capturing position. For example, by combining the attachment position of the camera device 2 with conditions such as the purpose of the image capturing location and the category of the image capturing location, the accuracy of the assignment of the identification information by the assigner 12 can be improved.

Further, an example in which "the features of the person included in the image data 210" are identical refers to an example of using the learning model 200 generated from image data including a person having a similar feature to a feature of the person included in the image data 210. In a case where the image data 210 is captured in a store with many female customers, the learning model 200 generated from image data captured in a store with many female customers is used. At this time, another identical condition can be combined with the feature of the person. For example, by combining the feature of the person with conditions such as the purpose of the image capturing location and the category of the image capturing location, the accuracy of the assignment of the identification information by the assigner 12 can be improved. In a case where the learning model is used for the flow line analysis, for example, in a case where the feature of the person included in the image data 210 is identical, the flow line of the person is often similar. Thus, the accuracy of the flow line analysis can be improved by using the learning model 200 generated using the image data in which the feature of the person included in the image data 210 is identical.

Further, for example, the feature information associated with the image data 210 may be a "color histogram" of the image data 210. The assigner 12 uses the learning model 200 in which a difference between the color histogram of the image data 210 and a color histogram associated with the learning model 200 is in a predetermined range. Here, as the color histogram, a distance function for quantizing values of hue and saturation and comparing histograms of the quantized values are used. For example, the color histogram associated with the learning model 200 is obtained by averaging image data used to generate the learning model 200. The "color histogram" can be obtained from the image data 210 by the control circuit 10 and stored in the storage 20, for example. Further, it is not necessary to obtain the color histogram for all the continuous image data 210, and for example, a color histogram obtained for a certain image data 210 can be used in association with a predetermined frame including the image data 210. Furthermore, instead of the histogram itself, a category of the color histogram may be set in accordance with a tendency of the color histogram, and the learning model 200 associated with the category specified from the color histogram of the image data 210 may be used.

Note that the learning model 200 to be used may be selected by a combination of the "color histogram" and the "image capturing condition" described above. For example, the learning model 200 in which the category of the image capturing location is identical and the difference between the color histograms is within a predetermined range may be used. Further, for example, the learning model 200 in which the purpose of the image capturing location and the feature of the person are identical and the difference between the color histograms is within a predetermined range may be used. As a result, the accuracy of the assignment of the identification information by the assigner 12 can be improved.

Figure 6:
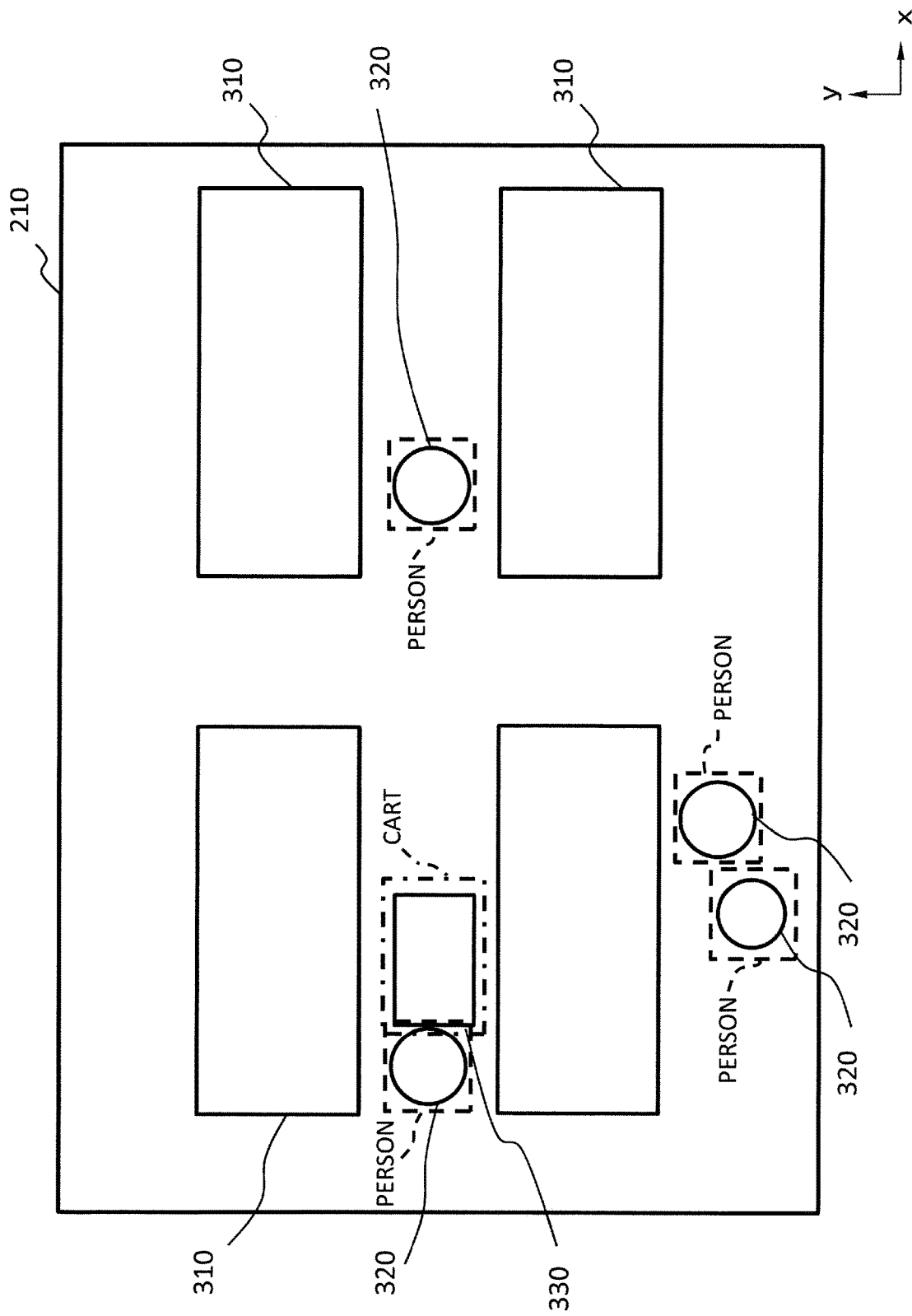
FIG. 6 is an example of identification information assigned to the image data in FIG. 5.

For example, as illustrated in FIG. 6, the assigner 12 assigns a plurality of pieces of identification information to the image illustrated in FIG. 5. Specifically, a region of a target for identification (identification target) is selected from the image data 210, and identification information of the identification target included in the selected region is assigned. The example illustrated in FIG. 5 is an example in which the assigner 12 assigns the identification information of "person" to the region (rectangle of broken line) of the person 320 and assigns the identification information of "cart" to the region (rectangle of one-dot chain line) of the cart 330. Note that, in the example illustrated in FIG. 6, the region of the person 320 is indicated by a rectangle of a broken line, and the region of the cart is indicated by a rectangle of a one-dot chain line, which are examples for distinction in the drawing. Further, when the identification targets are close to each other as in the example in which the regions of "person" and "cart" overlap each other in FIG. 6, a plurality of identification target regions may overlap each other.

Figure 7:
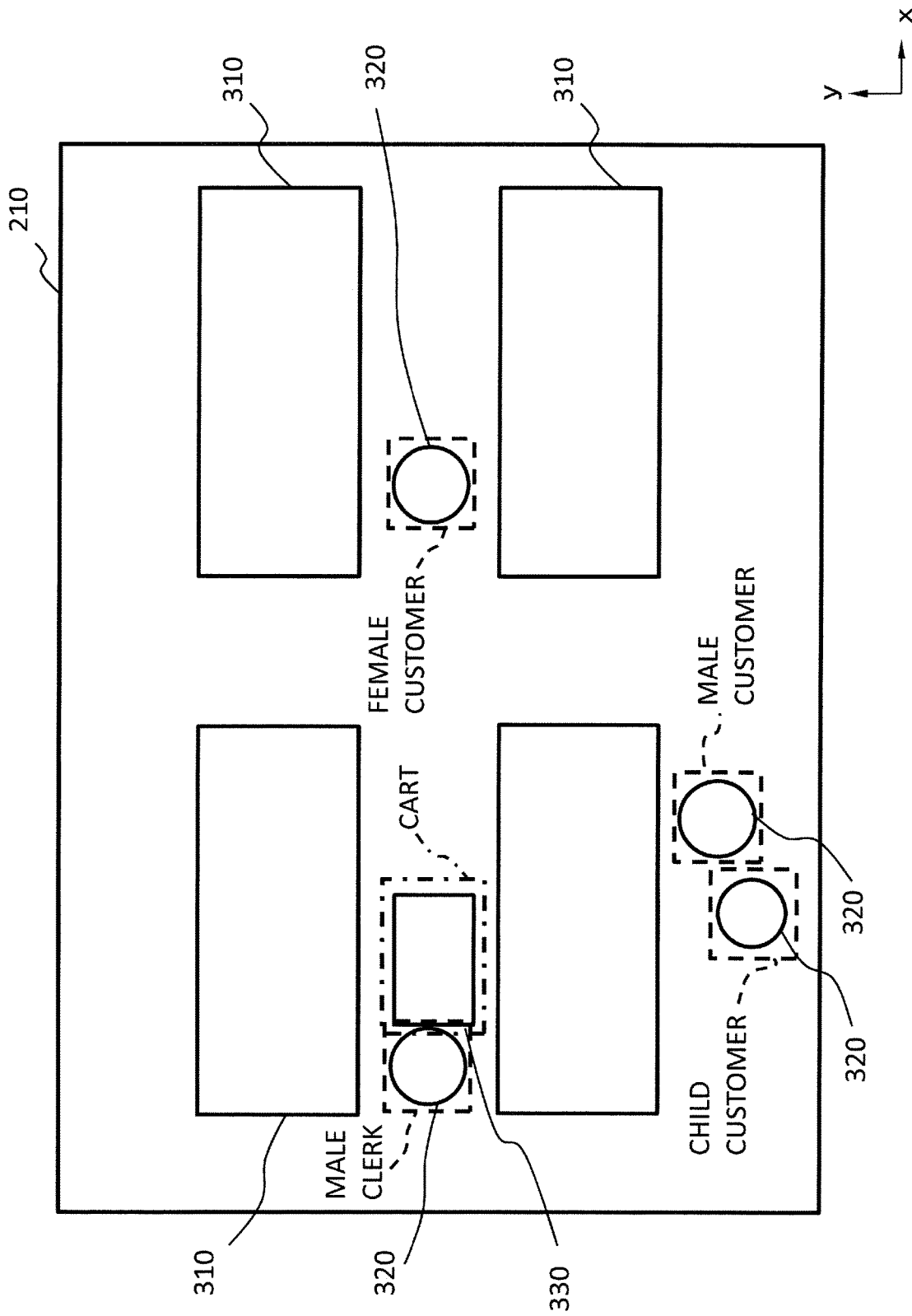
FIG. 7 is another example of the identification information assigned to the image data in FIG. 5.

Further, as illustrated in FIG. 7, the assigner 12 may be capable of assigning more detailed identification information to a person. Specifically, in the example illustrated in FIG. 7, more specific identification information such as "male clerk", "female customer", "child customer", and "male customer" is assigned to the person.

The updater 13 updates the learning model 200 using the image data 210 to which the identification information is assigned. Specifically, the updater 13 executes learning using the image data 210 to which the identification information is assigned by the "first annotation processing" and updates the learning model 200. Thereafter, the assigner 12 executes the "second annotation processing" using the updated learning model 200 and assigns the identification information to the rest of the image data 210.

The corrector 14 receives a request for correcting the identification information by displaying the image data 210 including the identification information assigned by the assigner 12 on the output device 23, and corrects the identification information in accordance with the request. That is, because the learning model 200 may not be generated specifically for the image data 210 captured by the camera device 2 in some cases, by performing correction by the corrector 14 as necessary, the accuracy of the learning model 200 can be improved, and the accuracy of analysis of the flow line analysis in the flow line analysis system 100 can also be improved.

For example, in a case where the identification information is assigned to the image data 210 as described above with reference to FIG. 7, for example, if the image data is erroneously identified as "male clerk" although the image data is originally "male customer", or if the image data is erroneously identified as "cart" although the image data is originally "male clerk", a request for correction of the identification information that has been erroneously assigned is received.

Note that the updater 13 updates the learning model 200 using the image data 210 whose identification information has been corrected by the corrector 14. Therefore, a timing at which the updater 13 updates the learning model 200 is a timing at which the corrector 14 confirms to the operator whether a correction is needed, and then it is confirmed that no correction is necessary ((5) in FIG. 4), a timing at which update is requested from the corrector 14 ((5-4) in FIG. 8), or a timing at which the correction of the identification information is completed by the corrector 14 ((5-6) in FIG. 8).

Figure 8:
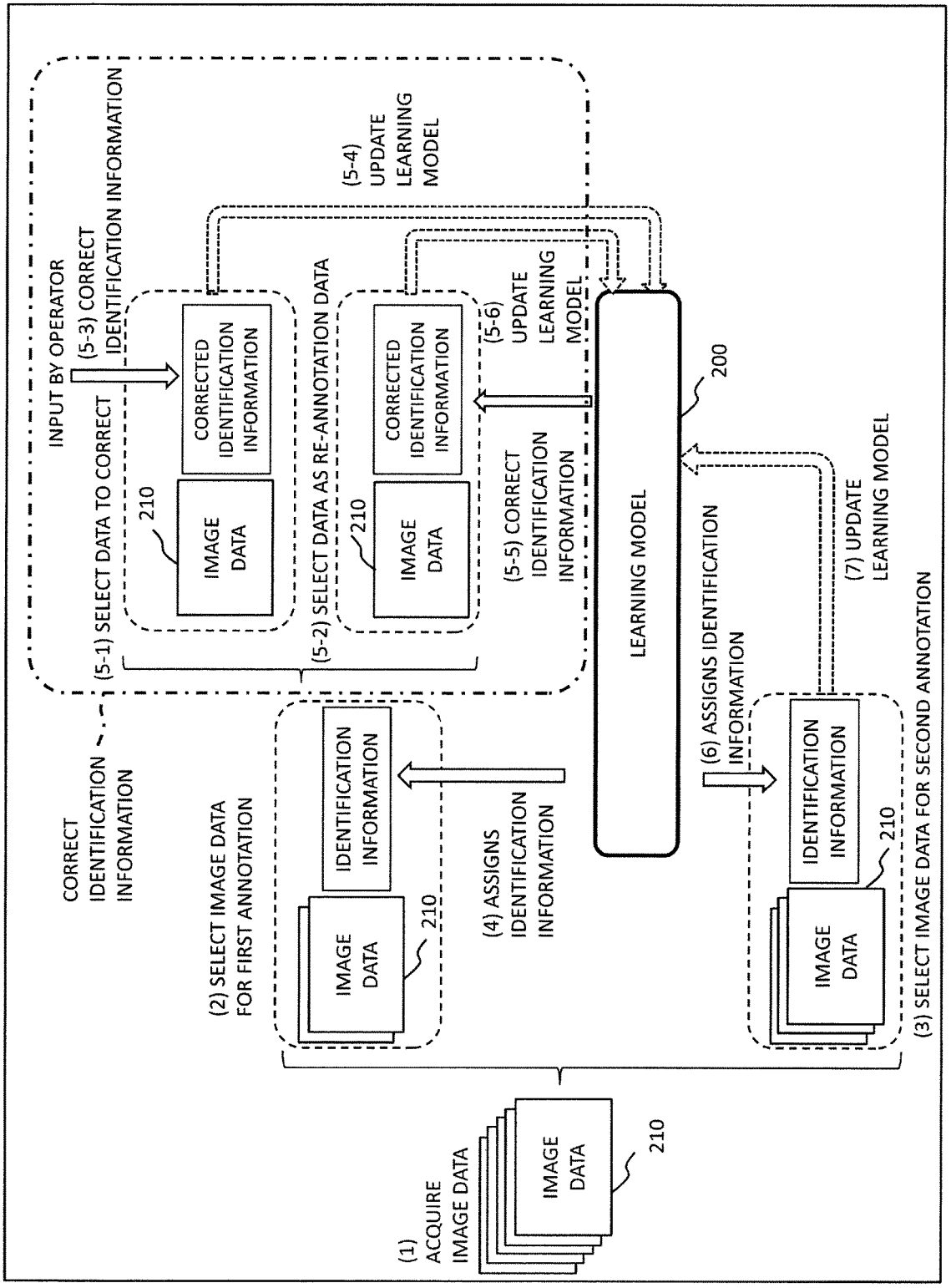
FIG. 8 is a conceptual diagram corresponding to FIG. 4 and explaining correction of identification information.

FIG. 8 corresponds to FIG. 4, and specifically illustrates a case where the identification information is corrected with respect to the image data to which the identification information is assigned by the first annotation processing (a section surrounded by a one-dot chain line in FIG. 8). Specifically, the corrector 14 selects at least a part of the image data 210 to which the identification information is assigned as correction data ((5-1) in FIG. 8), sets the rest of the image data 210 as re-annotation data ((5-2) in FIG. 8), displays correction image data on the output device 23, and confirms to the operator whether the correction is needed. For example, in a case where the identification information is assigned to the image data 210 of 500 frames by execution of the first annotation processing in the assigner 12, the corrector 14 can select, for example, any image data 210 arbitrarily selected by the operator from the image data as a correction target. As an alternative method, in a case where the identification information is assigned to the image data 210 of 500 frames, the corrector 14 can select the image data of frames as the correction target, for example, by extracting image data of one frame for every 20 frames.

Instead of a method in which the operator arbitrarily selects the image data 210 to be corrected, the corrector 14 may select the image data 210 to be corrected. Examples of a method by which the corrector 14 selects the image data 210 to be corrected include a "method of selecting at regular intervals", a "method of randomly selecting", and a "method of calculating a feature amount of each piece of image data 210 using image processing and selecting image data 210 having a large difference in features".

When a correction request from the operator is inputted via the input device 22, the corrector 14 corrects the identification information in accordance with the inputted request and updates the image data 210 in the storage 20 ((5-3) in FIG. 8). Further, the corrector 14 requests the updater 13 to update the learning model 200 with the image data 210 associated with the corrected identification information with respect to the image data 210 for correction ((5-4) in FIG. 8). When the learning model 200 is updated by the updater 13, the corrector 14 requests the assigner 12 to execute the annotation processing again for the image data 210 in which the correction of the identification information 230 has not been completed by the corrector 14 in accordance with the updated learning model 200, and corrects the identification information by assigning new identification information ((5-5) in FIG. 8). Thereafter, the corrector 14 requests the updater 13 to update the learning model 200 with the image data 210 associated with the corrected identification information ((5-6) in FIG. 8).

Note that FIG. 8 illustrates an example in which, when correcting the identification information, the identification information assignment apparatus 1 processes the identification information separately into the correction data for correcting the identification information by the operator and the annotation data for correcting the identification information by the annotation processing by the assigner 12. However, the identification information 230 may be corrected by the operator inputting for all the images for the first annotation.

When displaying the image data 210 including the identification information on the output device 23, the corrector 14 can display the identification information assigned by the assigner 12 and the identification information corrected by the corrector 14 to be distinguishable from each other. Further, the corrector 14 can correct the identification information a plurality of times. When displaying the image data 210 including the identification information on a display, the corrector 14 can display the identification information corrected by the corrector 14 in the past and the identification information newly corrected this time to be distinguishable from each other. Specifically, different colors indicate regions, or different forms (broken line, one-dot chain line, double line, wavy line, and the like) indicate regions. Further, characters as identification information are indicated in different colors and forms (font, character size, underline, and the like). As described above, by displaying the identification information assigned at different timings in different forms, for example, in a case where the operator selects the image data 210 to be corrected of the identification information, the corrector 14 can also determine whether the selection of the correction target is optimal.

As described above, the identification information assignment apparatus 1 can assign the identification information from the acquired image data 210 using the existing learning model 200, and can generate the target learning model by updating the learning model 200. This eliminates the need for the operator to manually assign the identification information, and makes it possible to simplify a task of assigning the identification information and improve the accuracy of the identification information to be assigned.

<Identification Information Assignment Method>

Figure 9:
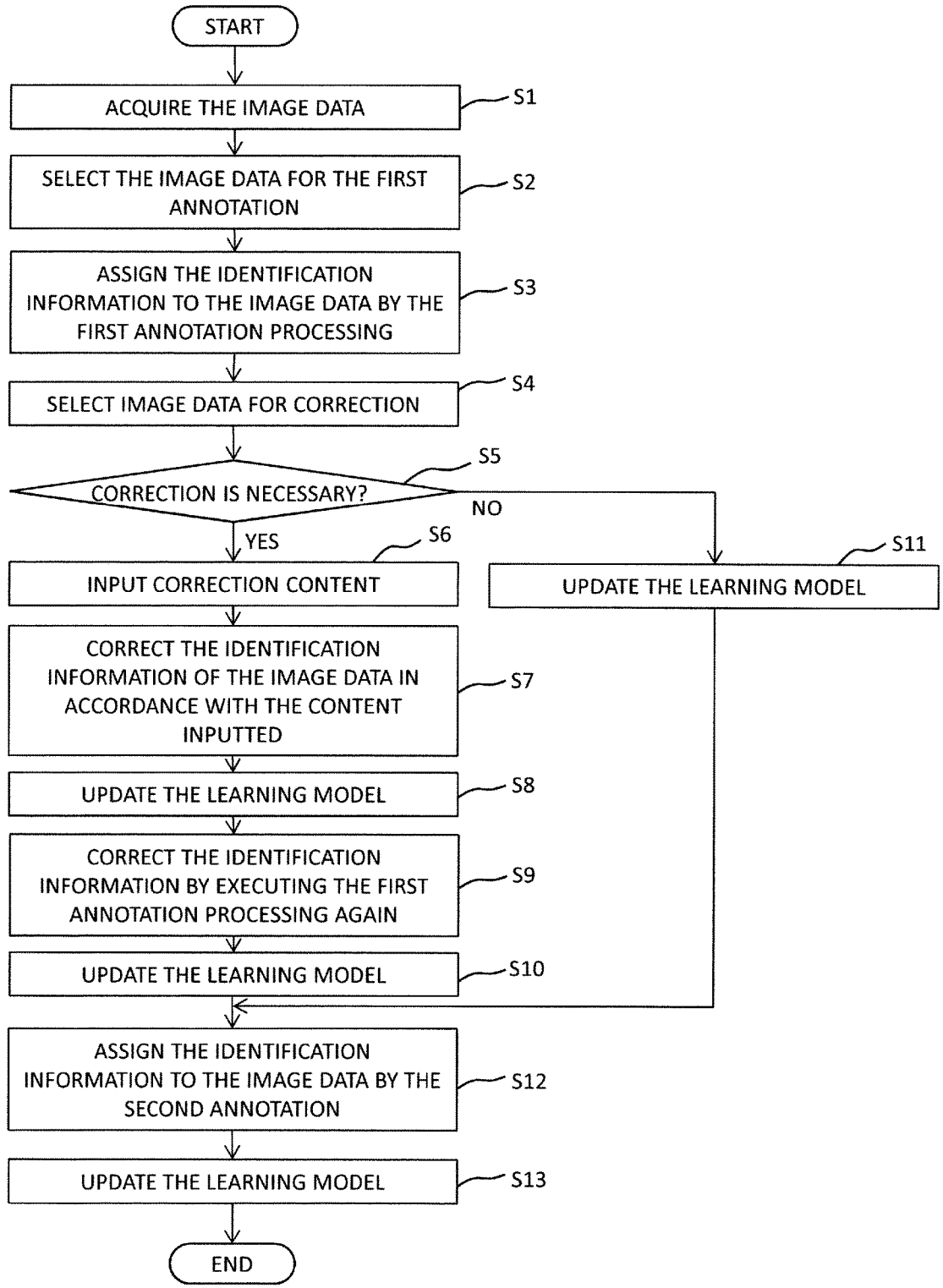
FIG. 9 is a flowchart illustrating an identification information assignment method of the present disclosure.

Next, an identification information assignment method performed by the identification information assignment apparatus 1 will be described with reference to a flowchart illustrated in FIG. 9.

The identification information assignment apparatus 1 acquires the image data 210 captured by the camera device 2 (S1). The image data 210 is the image data 210 of a plurality of continuous frames.

The identification information assignment apparatus 1 selects the image data 210 for the first annotation from the image data 210 acquired in step S1 (S2). Among the image data acquired in step S1, the image data 210 that has not been selected in step S2 is the image data 210 for the second annotation.

The identification information assignment apparatus 1 executes the first annotation processing, and assigns the identification information to the image data 210 selected in step S2 using the learning model 200 stored in the storage 20 (S3).

The identification information assignment apparatus 1 selects image data for correction from the image data 210 to which the identification information is assigned in step S3 (S4).

The identification information assignment apparatus 1 displays the image data 210 selected in step S4 on the output device 23 together with the identification information, and confirms whether correction is necessary (S5).

When the correction is necessary (YES in S5), in the identification information assignment apparatus 1, correction content of the identification information is inputted by the input device 22 (S6).

The identification information assignment apparatus 1 corrects the identification information of the image data 210 in accordance with the content inputted in step S6 (S7).

The identification information assignment apparatus 1 executes learning processing using the image data 210 to which the identification information is corrected in step S7 and updates the learning model 200 (S8).

The identification information assignment apparatus 1 corrects the identification information by executing the first annotation processing again using the learning model 200 updated in step S8 and assigning the identification information to the image data 210 of which the identification information is not corrected in step S7 (S9).

The identification information assignment apparatus 1 executes learning processing using the image data 210 to which the identification information is corrected in step S9 and updates the learning model 200 (S10). Here, for example, evaluation data that is an evaluation image not used for learning may be stored in advance in the storage 20, and the processing of steps S4 to S10 may be repeated until a detection rate using the evaluation data becomes a predetermined threshold or more.

If it is determined that there is no need to correct the identification information assigned in step S3 (NO in S5), the identification information assignment apparatus 1 executes learning processing using the image data 210 to which the identification information is assigned in step S3 and updates the learning model 200 (S11).

The identification information assignment apparatus 1 executes the second annotation processing using the learning model 200 updated in step S10 or step S11, and assigns the identification information to the image data 210 for the second annotation (S12).

The identification information assignment apparatus 1 executes learning processing using the image data 210 to which the identification information is assigned in step S12 and updates the learning model 200 (S13).

As described above, the identification information assignment apparatus 1 can assign the identification information from the acquired image data 210 using the existing learning model 200, and can generate the target learning model by updating the learning model 200. This eliminates the need for the operator to manually assign the identification information, and makes it possible to simplify a task of assigning the identification information and improve the accuracy of the identification information to be assigned.

Effects and Additions

As described above, the embodiment has been described as an example of the technique disclosed in the present application. However, the technique in the present disclosure is not limited to the embodiment, and is also applicable to the embodiment in which changes, replacements, additions, omissions, or the like are appropriately made. Therefore, another embodiment will be exemplified below.

Modification (1) Application of Motion Vector

Figure 10:
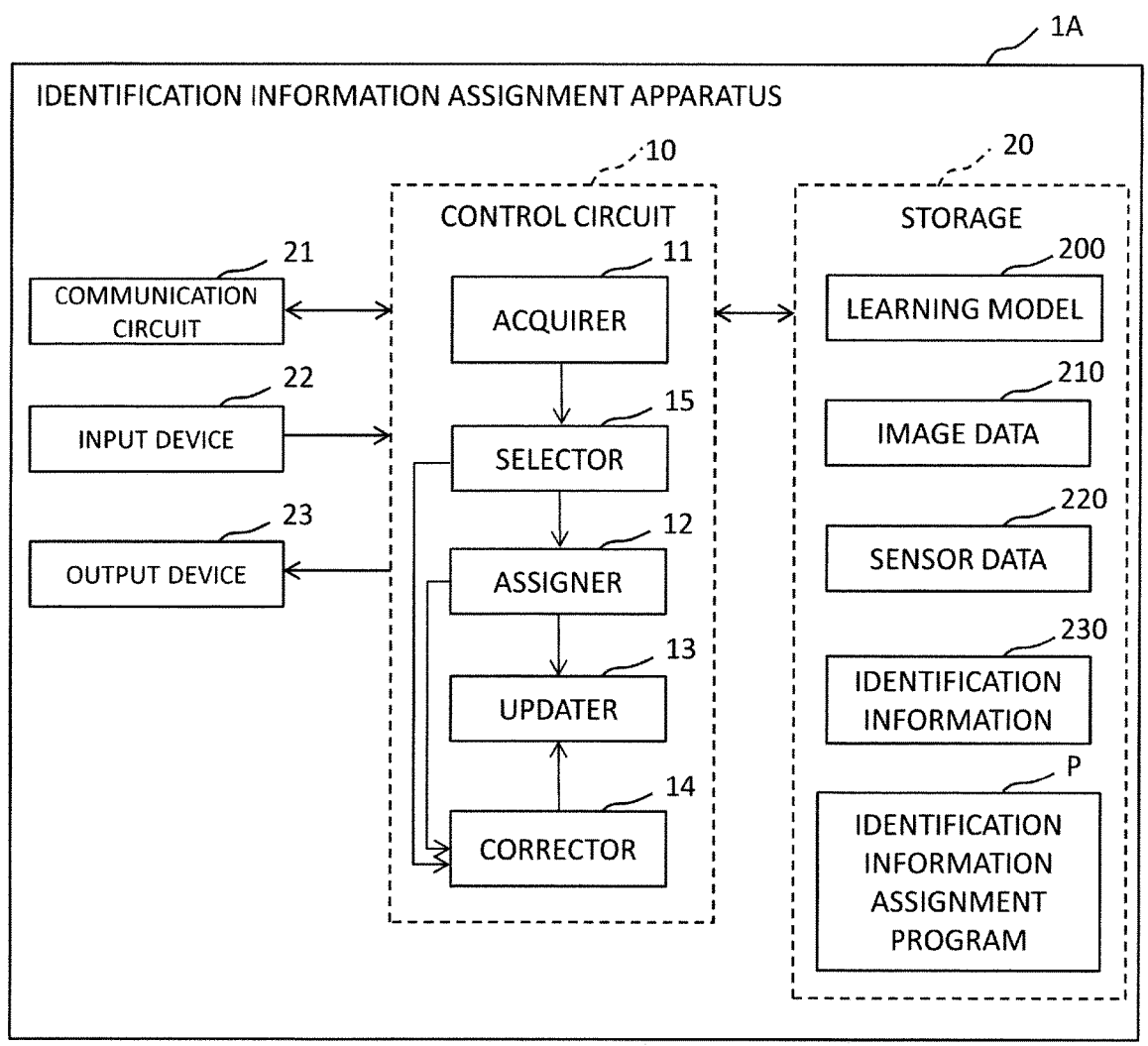
FIG. 10 is a block diagram illustrating a configuration of an identification information assignment apparatus according to a modification.

As illustrated in FIG. 10, an identification information assignment apparatus 1A may further include a selector 15. For example, the selector 15 detects a moving subject from image data selected from the plurality of pieces of image data, and selects a region of the moving subject.

Figure 11:
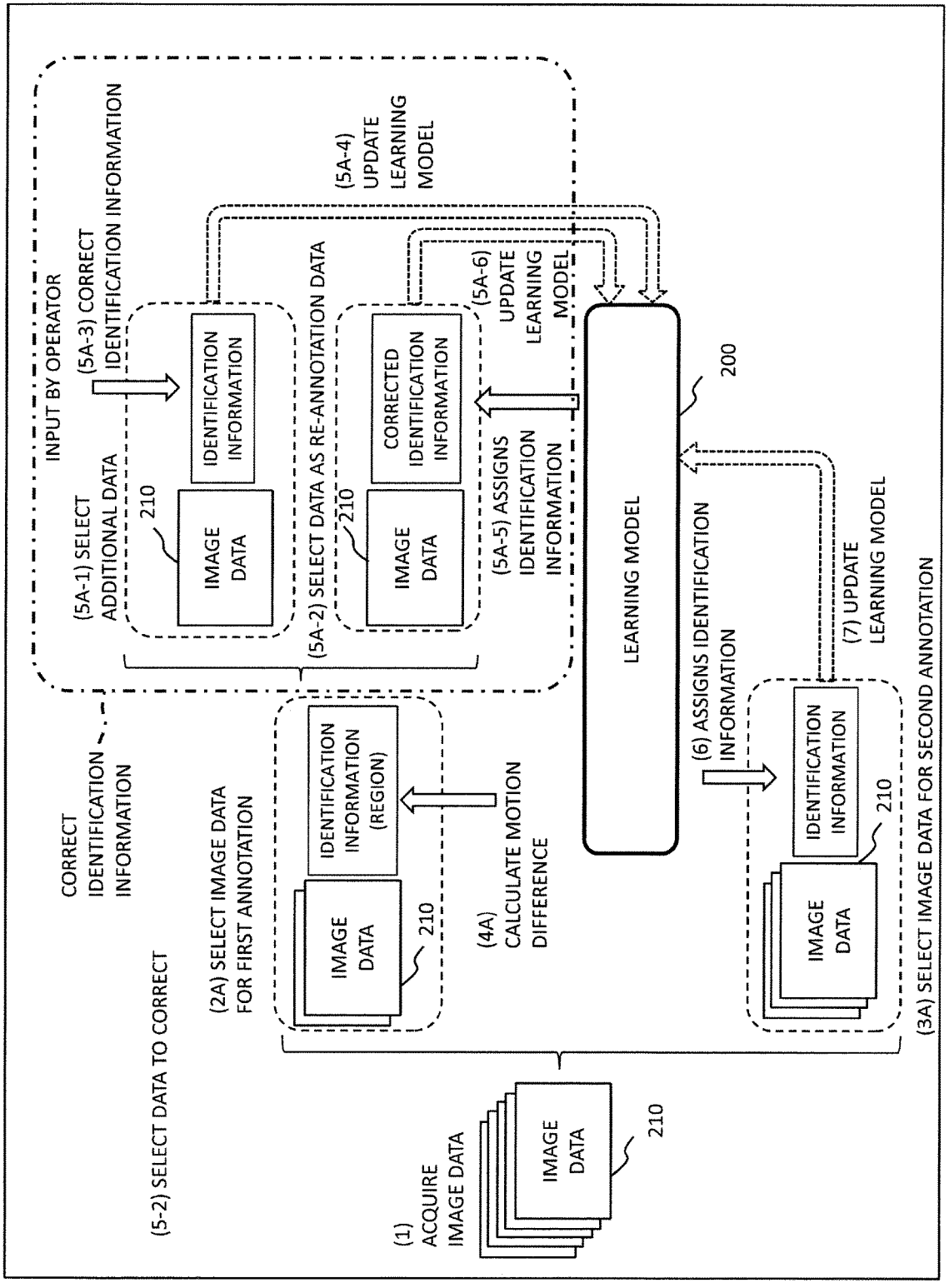
FIG. 11 is a conceptual diagram illustrating assignment and correction of identification information in the identification information assignment apparatus in FIG. 10.

For example, the selector 15 selects image data for the first annotation ((2A) in FIG. 11). Further, the selector 15 sets the other images as images for the second annotation ((3A) in FIG. 11). The selector 15 obtains a motion vector from the selected two frames (FIG. 4A). The motion vector is to compare pixel information from one frame as a reference to another frame and express a difference therebetween as a vector, and is also called a flow vector. This motion vector is specified, and thus a moving subject in the image data can be specified. Specifically, the selector 15 selects a region including a part where the motion vector is detected as, for example, a rectangular region. Further, the selector 15 associates the "coordinates", the "width", the "height", and the like for specifying the selected region with the image data 210 as the identification information 230, and stores the identification information 230 in the storage 20.

The corrector 14 selects additional image data 210 for adding a target "class" to the identification information 230 from the image data 210 associated with the region as the identification information 230 ((5A-1) in FIG. 11). Further, the corrector 14 sets the unselected image data 210 as annotation data ((5A-2) in FIG. 11). The corrector 14 displays a region that is the identification information 230 together with the image data 210, receives a request for correcting the identification information, and corrects the identification information 230 in accordance with the request (FIG. 11 (5A-3)). Specifically, the "class" is added to the identification information 230. Thereafter, the corrector 14 requests the updater 13 to update the learning model 200 with the image data 210 associated with the corrected identification information ((5A-4) in FIG. 11). Similarly to the case described above, the learning model 200 is preferably learned as learning data, using image data that is identical to or similar to the image data 210.

When the learning model 200 is updated by the updater 13, the corrector 14 requests the assigner 12 to execute the annotation processing for the image data 210 in which the correction of the identification information 230 has not been completed by the corrector 14 in accordance with the updated learning model 200, and corrects the identification information 230 by assigning new identification information 230 ((5A-5) in FIG. 8). Thereafter, the corrector 14 requests the updater 13 to update the learning model with the image data 210 associated with the corrected identification information 230 (FIG. 11 (5A-6)). Subsequently, the assigner 12 assigns the identification information to the image data 210 for the second annotation to which the identification information has not been assigned by the first annotation processing by the updated learning model 200 as "second annotation processing" ((6) in FIG. 11). Then, the learning model 200 is updated by the image data 210 for the second annotation to which the identification information is assigned by the updater 13 ((7) in FIG. 11).

Note that FIG. 11 illustrates an example in which, when correcting the identification information, the identification information assignment apparatus 1A processes the identification information separately into addition data for adding the identification information by the operator and the annotation data for correcting the identification information by the annotation processing by the assigner 12. However, the identification information 230 may be added by the operator inputting for all the images for the first annotation.

Thus, even in a case where it is difficult to assign the identification information by the first annotation processing using the existing learning model 200, it is possible to detect the motion vector, specify the target region, and assign the identification information using this region. This makes it possible to simplify the work of assigning the identification information by the operator and improve the accuracy of the identification information to be assigned.

(2) Annotation of Only Enclosure Class

In the example described above, the identification information 230 erroneously assigned is corrected, but the present invention is not limited thereto. The same applies to a case where the identification information 230 of a superclass is corrected to the identification information 230 of a subclass. Specifically, in the first annotation processing, the identification information 230 of a superclass is assigned, the identification information is corrected to the identification information 230 of a subclass in correction processing of the identification information, and the second annotation processing may be executed using the learning model 200 updated by the correction. For example, first, identification information of "person" as a superclass may be assigned by the learning model 200, and the identification information may be corrected to identification information of "male", "female", "adult", "child", or the like as a subclass.

Figure 12:
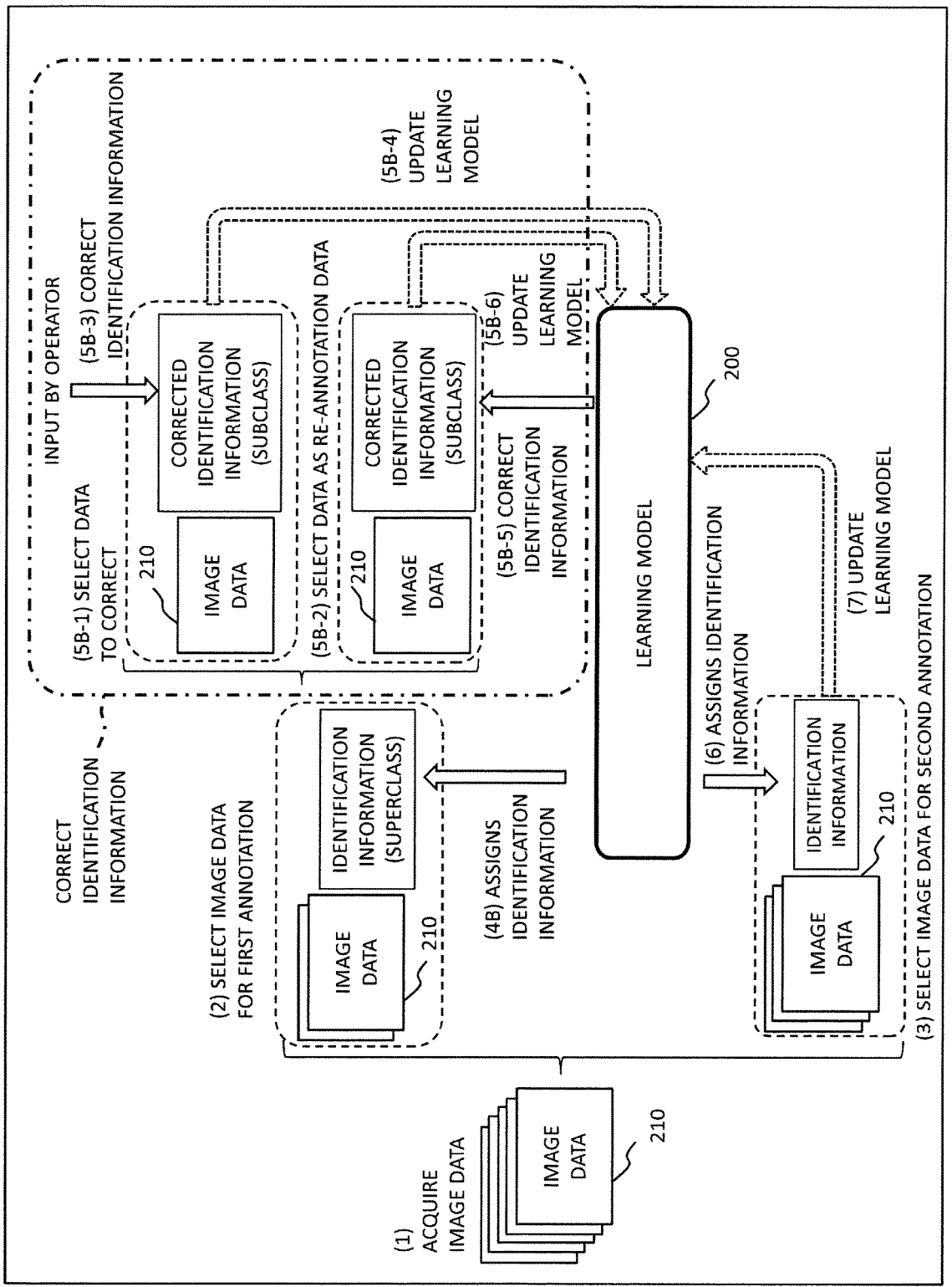
FIG. 12 is a conceptual diagram illustrating a modification of assignment and correction of identification information in the identification information assignment apparatus in FIG. 3.

For example, as illustrated in FIG. 12, when the image data 210 for the first annotation and the image data 210 for the second annotation are selected from the acquired image data 210, the assigner 12 assigns the identification information by the learning model 200 ((4B) in FIG. 12). The identification information 230 assigned here includes identification information of a superclass. Thereafter, the corrector 14 selects the image data 210 for correction from the image data 210 for the first annotation ((5B-1) in FIG. 12), and sets the rest of the image data 210 as the image data for the second annotation ((5B-2) in FIG. 12). Further, the corrector 14 corrects the identification information in accordance with the request inputted from the operator, and updates the image data 210 in the storage 20 ((5B-3) in FIG. 12). Here, the corrected identification information 230 includes identification information of a subclass. Further, the corrector 14 requests the updater 13 to update the learning model 200 with the image data 210 associated with the corrected identification information with respect to the image data 210 for correction ((5B-4) in FIG. 12).

When the learning model 200 is updated by the updater 13, the corrector 14 requests the assigner 12 to execute the annotation processing again for the image data 210 in which the correction of the identification information 230 has not been completed by the corrector 14 in accordance with the updated learning model 200, and corrects the identification information by assigning new identification information ((5B-5) in FIG. 12). Here, the corrected identification information 230 includes identification information of a subclass. Thereafter, the corrector 14 requests the updater 13 to update the learning model 200 with the image data 210 associated with the corrected identification information (FIG. 12 (5B-6)). Subsequently, the assigner 12 assigns the identification information to the image data 210 for the second annotation to which the identification information has not been assigned by the first annotation processing by the updated learning model 200 as "second annotation processing" ((6) in FIG. 12). Then, the learning model 200 is updated by the image data 210 for the second annotation to which the identification information is assigned by the updater 13 ((7) in FIG. 12).

Note that FIG. 12 illustrates an example in which, when correcting the identification information, the identification information assignment apparatus 1 processes the identification information separately into the correction data for correcting the identification information by the operator and the annotation data for correcting the identification information by the annotation processing by the assigner 12. However, the identification information 230 may be corrected by the operator inputting for all the images for the first annotation.

At the time of annotation of a plurality of classes, an enclosure class is automatically annotated, then corrected, and finally annotated to improve the work efficiency.

Outline of Embodiment (1) An identification information assignment apparatus of the present disclosure includes an acquirer configured to acquire a plurality of pieces of image data, an assigner configured to assign identification information to image data selected from the plurality of pieces of image data by using a learning model after learning, and an updater configured to update the learning model using the image data to which the identification information is assigned, in which the assigner assigns identification information to the rest of the image data acquired by the acquirer using the learning model that has been updated.

As a result, it is possible to assign the identification information using the existing learning model from the acquired image data and generate the target learning model by updating the learning model. This eliminates the need for the operator to manually assign the identification information, and makes it possible to simplify the task of assigning the identification information and improve the accuracy of the identification information to be assigned.

(2) The identification information assignment apparatus of (1) may further include a corrector configured to display the image data and the identification information assigned to the image data by the assigner on a display, receive a request for correcting the identification information, and correct the identification information in accordance with the request, in which the updater may update the learned model using the image data in which the identification information is corrected by the corrector.

As a result, the identification information assigned by the existing learning model can be corrected as necessary, and the accuracy of the identification information can be improved.

(3) In the identification information assignment apparatus of (2), the identification information may be correctable by the corrector a plurality of times, and when the corrector displays the image data and the identification information on the display, the corrector may display the identification information corrected by the corrector before and the identification information newly corrected to be distinguishable from each other.

As a result, correction work of the identification information can be evaluated, and the accuracy of the correction work can be improved.

(4) In the identification information assignment apparatus of (2), when the corrector displays the image data and the identification information on the display, the corrector may display the identification information assigned by the assigner and the identification information corrected by the corrector to be distinguishable from each other.

As a result, the correction work of the identification information can be evaluated, and the accuracy of the correction work can be improved.

(5) In the identification information assignment apparatus of (1), a plurality of the learned models including feature information of an image may be available to the assigner, and the assigner may use the learned model including feature information of the image data acquired by the acquirer and feature information of a predetermined range.

This makes it possible to select and use an optimal learning model from the plurality of existing learning models and improve the accuracy of assignment of the identification information.

(6) In the identification information assignment apparatus of (5), the feature information may include an image capturing condition of image data, and the assigner may use the learned model associated with an identical image capturing condition to the image capturing condition of the image data.

This makes it possible to select and use an optimal learning model from the plurality of existing learning models and improve the accuracy of assignment of the identification information.

(7) In the identification information assignment apparatus of (5), the feature information may include a color histogram of image data, and the assigner may use the learned model in which a difference from a color histogram of the image data is associated with a color histogram in a predetermined range.

This makes it possible to select and use an optimal learning model from the plurality of existing learning models and improve the accuracy of assignment of the identification information.

(8) The identification information assignment apparatus of (2) may further include a selector configured to detect a moving subject from image data selected from the plurality of pieces of image data and select a region of the subject, in which the corrector may display the image data and the region selected by the selector for the image data as identification information, receive a request for correcting the identification information, and correct the identification information in accordance with the request.

This makes it possible to select a moving region from the image data to be acquired and to simplify manual assignment of the identification information by the operator.

(9) In the identification information assignment apparatus of (1), the plurality of pieces of image data may be continuous image data.

Thus, the identification information assignment apparatus can assign the identification information from the acquired continuous image data using the existing learning model, and can generate the target learning model by updating the learning model.

(10) An identification information assignment method of the present disclosure includes acquiring a plurality of pieces of image data, assigning identification information to image data selected from the plurality of pieces of image data by using a learning model after learning, updating the learning model by using the image data to which the identification information is assigned, and assigning identification information to the rest of the image data acquired using the learned model that has been updated.

As a result, it is possible to assign the identification information using the existing learning model from the acquired image data and generate the target learning model by updating the learning model. This eliminates the need for the operator to manually assign the identification information, and makes it possible to simplify the task of assigning the identification information and improve the accuracy of the identification information to be assigned.

(11) A non-transitory computer-readable recording medium storing a computer program causing a control circuit include in a computer to implement the identification information assignment method of the present disclosure includes acquiring a plurality of pieces of image data, assigning identification information to image data selected from the plurality of pieces of image data by using a learning model after learning, updating the learned model by using the image data to which the identification information is assigned, and assigning identification information to the rest of the image data acquired using the learned model that has been updated.

As a result, it is possible to assign the identification information using the existing learning model from the acquired image data and generate the target learning model by updating the learning model. This eliminates the need for the operator to manually assign the identification information, and makes it possible to simplify the task of assigning the identification information and improve the accuracy of the identification information to be assigned.

The identification information assignment apparatus and the identification information assignment method described in all the claims of the present disclosure are implemented in coordination with hardware resources, for example, a processor, a memory, and a computer program.

The identification information assignment apparatus and the identification information assignment method of the present disclosure are useful for creating teacher data of machine learning.

The invention claimed is:

1. An identification information assignment apparatus comprising:
   an acquirer configured to acquire a plurality of pieces of image data;
   an assigner configured to assign identification information to image data selected from the plurality of pieces of image data by using a learning model after learning; and
   an updater configured to update the learned model using the image data to which the identification information is assigned,
   wherein the assigner assigns identification information to a rest of the plurality of pieces of image data acquired by the acquirer using the learned model that has been updated,
   the apparatus further comprising a corrector configured to display the image data and the identification information assigned to the image data by the assigner on a display, receive a request for correcting the identification information, and correct the identification information in accordance with the request,
   the updater updates the learned model using the image data in which the identification information is corrected by the corrector,
   correcting the identification information by the corrector and assigning the identification information by the assigner are repeatable, and
   when the corrector displays the image data and the identification information on the display, the corrector displays (a) the identification information which is previously corrected by the corrector and currently not assigned by the assigner, (b) the identification information currently assigned by the assigner, and (c) the identification information currently corrected by the corrector to be distinguishable from each other.

2. The identification information assignment apparatus according to claim 1,
   wherein a plurality of the learned models including feature information of an image data is available to the assigner, and
   the assigner uses the learned model including feature information of the image data acquired by the acquirer and feature information of a predetermined range.

3. The identification information assignment apparatus according to claim 2,
   wherein the feature information includes an image capturing condition of image data, and
   the assigner uses the learned model associated with an identical image capturing condition to the image capturing condition of the image data.

4. The identification information assignment apparatus according to claim 2,
   wherein the feature information includes a color histogram of image data, and
   the assigner uses the learned model in which a difference from a color histogram of the image data is associated with a color histogram in a predetermined range.

5. The identification information assignment apparatus according to claim 1, further comprising a selector configured to detect a moving subject from image data selected from the plurality of pieces of image data and select a region of the subject,
   wherein the corrector displays the image data and the region selected by the selector for the image data as the identification information, receives a request for correcting the identification information, and corrects the identification information in accordance with the request.

6. The identification information assignment apparatus according to claim 1, wherein the plurality of pieces of image data is continuous image data.

7. An identification information assignment method comprising:
   acquiring a plurality of pieces of image data;
   assigning identification information to image data selected from the plurality of pieces of image data by using a learned model after learning;
   updating the learning model by using the image data to which the identification information is assigned; and
   assigning identification information to a rest of the plurality of pieces of image data acquired using the learned model that has been updated,
   displaying the image data and the identification information assigned to the image data on a display, receive a request for correcting the identification information, and correct the identification information in accordance with the request,
   updating the learned model using the image data in which the identification information is corrected,
   correcting identification information and assigning of the identification information are repeatable, and
   when displaying the image data and the identification information on the display, (a) the identification information which is previously corrected and currently not assigned, (b) the identification information currently assigned, and (c) the identification information currently corrected are displayed to be distinguishable from each other.

8. A non-transitory computer-readable recording medium storing a computer program causing a control circuit included in an identification information assignment apparatus to execute:
   acquiring a plurality of pieces of image data;
   assigning identification information to image data selected from the plurality of pieces of image data by using a learning model after learning;
   updating the learned model by using the image data to which the identification information is assigned; and
   assigning identification information to a rest of the plurality of pieces of image data acquired using the learned model that has been updated,
   displaying the image data and the identification information assigned to the image data on a display, receive a request for correcting the identification information, and correct the identification information in accordance with the request,
   updating the learned model using the image data in which the identification information is corrected,
   correcting the identification information and assigning the identification information are repeatable, and when displaying the image data and the identification information on the display, (a) the identification information which is previously corrected and currently not assigned, (b) the identification information currently assigned, and (c) the identification information currently corrected are displayed to be distinguishable from each other.

\* \* \* \* \*